United States Patent
Deyrail et al.

(10) Patent No.: US 11,299,626 B2
(45) Date of Patent: Apr. 12, 2022

(54) USE OF A PREPOLYMER IN TRANSPARENT THERMOPLASTIC COMPOSITIONS, COMPOSITIONS COMPRISING SAME AND USES THEREOF

(71) Applicant: ARKEMA FRANCE, Colombes (FR)

(72) Inventors: Yves Deyrail, Aviron (FR); Mathieu Sabard, Serquigny (FR); Philippe Blondel, Bernay (FR); René-Paul Eustache, Combon (FR)

(73) Assignee: ARKEMA FRANCE, Colombes (FR)

( * ) Notice: Subject to any disclaimer, the term of this patent is extended or adjusted under 35 U.S.C. 154(b) by 322 days.

(21) Appl. No.: 15/759,009

(22) PCT Filed: Sep. 20, 2016

(86) PCT No.: PCT/FR2016/052373
§ 371 (c)(1),
(2) Date: Mar. 9, 2018

(87) PCT Pub. No.: WO2017/051105
PCT Pub. Date: Mar. 30, 2017

(65) Prior Publication Data
US 2018/0291202 A1    Oct. 11, 2018

(30) Foreign Application Priority Data

Sep. 22, 2015   (FR) .................................... 1558911

(51) Int. Cl.
| C08L 77/02 | (2006.01) |
| C08G 69/36 | (2006.01) |
| C08L 77/06 | (2006.01) |

(52) U.S. Cl.
CPC .............. *C08L 77/02* (2013.01); *C08G 69/36* (2013.01); *C08L 77/06* (2013.01)

(58) Field of Classification Search
None
See application file for complete search history.

(56) References Cited

U.S. PATENT DOCUMENTS

| 3,287,443 A | 11/1966 | Saito et al. |
| 3,657,391 A | 4/1972 | Curfman |
(Continued)

FOREIGN PATENT DOCUMENTS

| EP | 2843726 A1 | 3/2015 | |
| FR | 2994975 A1 * | 3/2014 | ............... A43B 1/14 |

OTHER PUBLICATIONS

International Search Report and Written Opinion for International Application No. PCT/FR2016/052373, dated Dec. 16, 2016, 9 Pages.

(Continued)

*Primary Examiner* — Randy P Gulakowski
*Assistant Examiner* — Ha S Nguyen
(74) *Attorney, Agent, or Firm* — Buchanan Ingersoll & Rooney P.C.

(57) ABSTRACT

The invention relates to the use of at least one prepolymer in a composition which includes: a matrix of at least one transparent semi-crystalline polyamide, and optionally at least one additive, for improving the crystallisation kinetics and reducing the warping of the composition while preserving or improving the transparency properties thereof as well as the mechanical properties thereof, in comparison with the same composition without a prepolymer, wherein the composition does not contain a nucleating agent.

32 Claims, 4 Drawing Sheets

(56) References Cited

U.S. PATENT DOCUMENTS

| | | | |
|---|---|---|---|
| 3,808,180 A | | 4/1974 | Owens |
| 3,985,704 A | | 10/1976 | Jones et al. |
| 4,096,202 A | | 6/1978 | Farnham et al. |
| 4,180,494 A | | 12/1979 | Fromuth et al. |
| 4,260,693 A | | 4/1981 | Liu |
| 4,299,928 A | | 11/1981 | Witman |
| 5,496,918 A | | 3/1996 | Khanna et al. |
| 6,916,517 B2 | * | 7/2005 | Montanari ............... C08L 77/00 280/601 |
| 2003/0158308 A1 | | 8/2003 | Nay et al. |
| 2006/0030692 A1 | * | 2/2006 | Montanari ........... C09D 177/00 528/310 |
| 2007/0179252 A1 | | 8/2007 | Lamberts et al. |
| 2009/0131569 A1 | * | 5/2009 | Schwitter ................ C08L 77/00 524/423 |
| 2009/0131674 A1 | * | 5/2009 | Schmid ................. C08G 69/14 546/244 |
| 2010/0028646 A1 | | 2/2010 | Schwitter et al. |
| 2013/0150515 A1 | | 6/2013 | Mao et al. |
| 2015/0225505 A1 | * | 8/2015 | Blondel ................... A43B 1/14 428/36.9 |

OTHER PUBLICATIONS

International Standard ISO/IEC, vol. ISO16396-1:2015(E), (2015).

\* cited by examiner

USE OF A PREPOLYMER IN TRANSPARENT THERMOPLASTIC COMPOSITIONS, COMPOSITIONS COMPRISING SAME AND USES THEREOF

CROSS-REFERENCE TO RELATED APPLICATIONS

This is the U.S. National Phase of International Application No. PCT/FR2016/052373, filed Sep. 20, 2016, which claims priority to French Application No. 1558911, filed Sep. 22, 2015. The disclosure of each of these applications is incorporated herein by reference in its entirety for all purposes.

FIELD OF THE INVENTION

The present invention relates to the use of prepolymers in thermoplastic compositions comprising a matrix constituted of a semicrystalline transparent polyamide to improve the crystallization kinetics and to reduce the warpage relative to a composition free of prepolymer, while at the same time conserving or improving the transparency properties (transmittance and Haze) and also the mechanical properties of said composition without reducing its mechanical properties such as the impact strength, the modulus or the Ross flex.

The invention also relates to compositions comprising the prepolymers and also to the use thereof for extrusion or injection, especially for the manufacture of articles obtained by extrusion or injection, in particular for the manufacture of sports shoes, especially football boots, ski boots or running shoes, or compression molding.

The invention also relates to a process for preparing said compositions and to a process for manufacturing said sports articles, and also to the articles obtained via said process.

BACKGROUND OF THE INVENTION

Thermoplastic polyamide-based compositions are raw materials that can be transformed by extrusion, molding or injection, especially by injection molding, to manufacture plastic parts.

There are several major properties that it is desired to obtain for these polyamide-based compositions, especially when they are used in these transformation processes.

One of these properties lies in the fact that thermoplastic compositions used must be characterized by high transparency, which then necessitates the use of a nucleating agent to aid the crystallization and to prevent post-molding warpage.

Nucleating agents such as talc are already known, especially from patent applications US 2013/0150515 and EP2843726.

Nevertheless, nucleating agents such as talc have the drawback of scattering light in polyamides and thus of impairing the transparency of the composition. To limit this scattering, the contents of the nucleating agent to be used lead to size instability on annealing (warpage) due to the fact that the composition does not crystallize sufficiently during the injection process.

SUMMARY OF THE INVENTION

The present invention makes it possible to overcome the drawbacks of the prior art. In particular, the invention makes it possible to achieve faster crystallization kinetics and reduced warpage, in particular during annealing of the semicrystalline transparent polyamide-prepolymer blend at a temperature above the Tg of the transparent semicrystalline polyamide, while at the same time improving or conserving excellent transparency properties (transmittance and Haze) and also the mechanical properties such as the impact strength, the modulus or the Ross flex.

This has been achieved by using a prepolymer in a composition comprising a semicrystalline transparent polyamide.

It has been found that the use of said prepolymer significantly accelerates the crystallization and reduces the warpage of the semicrystalline transparent polyamide composition while at the same time improving or at least conserving the transparency properties (transmittance and Haze) and while also preserving (or even improving) the mechanical properties thereof.

DETAILED DESCRIPTION OF THE INVENTION

Figure 1:
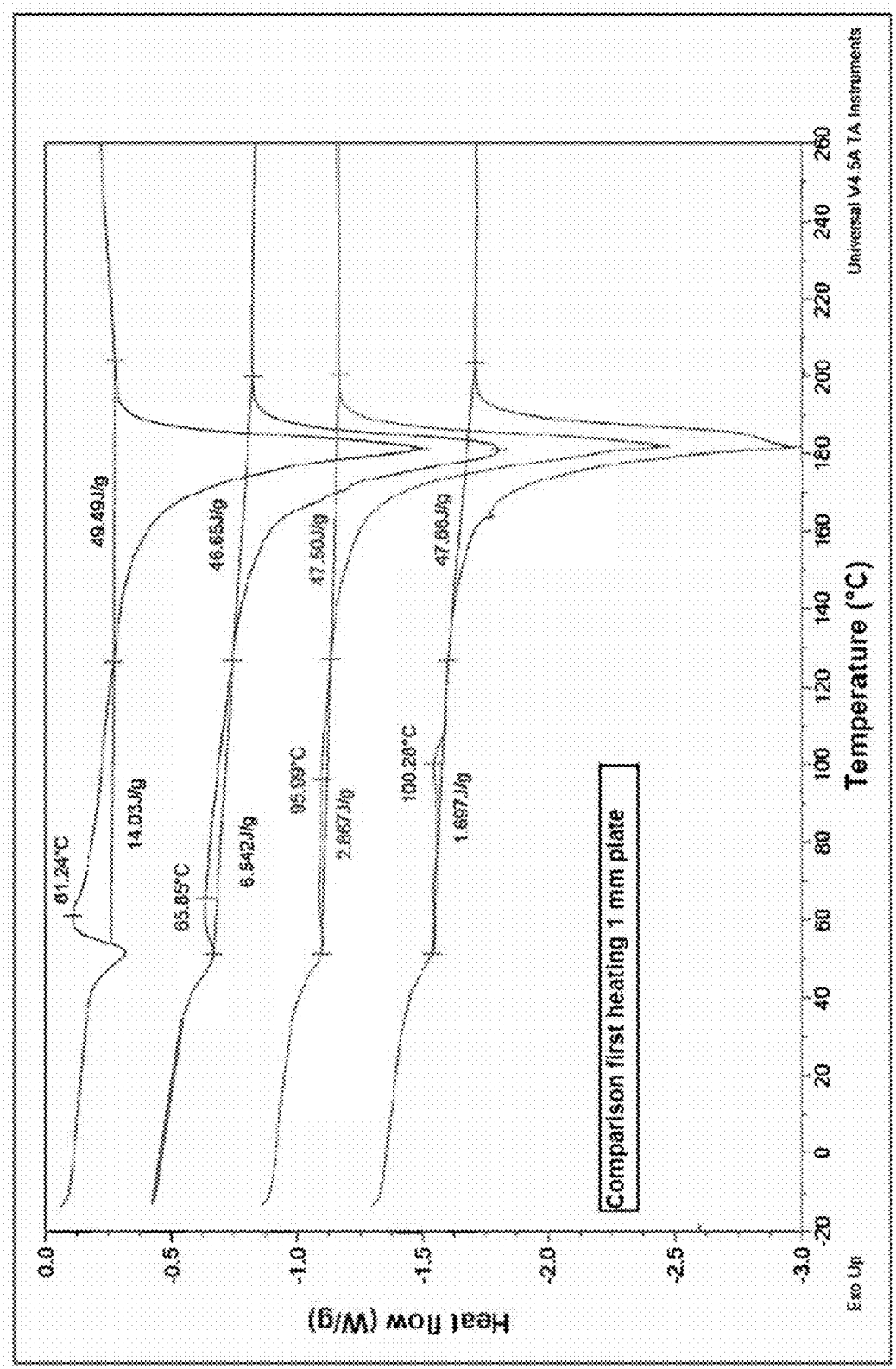
FIG. 1 shows differential scanning calorimetry thermograms of certain examples according to the invention and comparative examples not according to the invention.

The present invention relates to the use of at least one prepolymer in a composition comprising:
  a matrix constituted of at least one semicrystalline transparent polyamide, and
  optionally at least one additive,
to improve the crystallization kinetics and to reduce the warpage of said composition while at the same time conserving or improving its transparency properties and also its mechanical properties, when compared with the same composition free of prepolymer, said composition being free of nucleating agent.

The transparency of a material is defined according to two main criteria:

The coefficient of light transmission measured at a wavelength of 560 nm and for a plate thickness of 1 or 2 mm, especially 2 mm according to standard ISO 13468-2:2006, and the Haze determined according to standard D1003-97 (C).

The term Haze or cloudiness should be understood as meaning surface dullness, a veiling, fogging or misting effect at the surface of the material. This effect is commonly known as "fogging". This effect may impair the transparency, the esthetic appearance and the surface gloss of the object constituted from said material.

For the purposes of the invention, the term "semicrystalline transparent polyamide" denotes transparent polyamides which have a melting point (Tm) and a heat of fusion $\Delta H > 10$ J/g, in particular $>12$ J/g, and also a glass transition temperature (Tg) as determined by DSC according to standard ISO 11357-1: 2009 and ISO 11357-2 and 3: 2013, at a heating rate of 20 K/min.

Advantageously, the semicrystalline transparent polyamide has a transmittance of greater than or equal to 75% as measured at a wavelength of 560 nm and for a plate thickness of 2 mm according to standard ISO 13468-2:2006.

Thus, the semicrystalline transparent polyamide has a Haze of less than or equal to 30% as measured for a plate thickness of 2 mm according to standard D1003-97 (C).

Advantageously, the semicrystalline transparent polyamide has a transmittance of greater than or equal to 75% as measured at a wavelength of 560 nm and for a plate thickness of 2 mm according to standard ISO 13468-2:2006 and a Haze of less than or equal to 30% as measured for a plate thickness of 2 mm according to standard D1003-97 (C).

Advantageously, the semicrystalline transparent polyamide has a transmittance of greater than or equal to 85% as measured at a wavelength of 560 nm and for a plate thickness of 1 mm according to standard ISO 13468-2:2006.

Advantageously, the semicrystalline transparent polyamide has a Haze of less than or equal to 15% as measured for a plate thickness of 1 mm according to standard D1003-97 (C).

Advantageously, the semicrystalline transparent polyamide has a transmittance of greater than or equal to 85% as measured at a wavelength of 560 nm and for a plate thickness of 1 mm according to standard ISO 13468-2:2006 and a Haze of less than or equal to 15% as measured for a plate thickness of 1 mm according to standard D1003-97 (C).

Advantageously, the semicrystalline transparent polyamide has a number-average molecular mass of greater than 10 000 g/mol.

Advantageously, the composition defined above is free of photochromic dye.

Throughout the description, the term "polyamide" denotes a homopolyamide, a copolyamide or a blend thereof, provided that said homopolyamide, copolyamide or blend thereof is transparent, in particular has a transmittance of greater than or equal to 75% as defined above and semicrystalline.

The nomenclature used to define polyamides is described in standard ISO 1874-1:2011 *Plastics—Polyamide (PA) molding and extrusion materials—Part* 1: *Designation*", in particular on page 3 (tables 1 and 2), and is well known to those skilled in the art.

The homopolyamide is either an aliphatic repeating unit of formula A:

A being chosen from a unit obtained from at least one aminocarboxylic acid, a unit obtained from at least one branched aminocarboxylic acid and a unit obtained from at least one lactam, or of formula X.Y:

X.Y being a repeating unit obtained from the polycondensation of at least one cycloaliphatic amine or from at least one linear or branched aliphatic diamine or from at least one arylamine and from at least one dicarboxylic acid comprising from 4 to 36 carbon atoms, advantageously from 6 to 18 carbon atoms.

The copolyamide according to the invention comprises at least two different repeating units corresponding to the following general formula:

A/X.Y in which A and X.Y are as defined above.

Repeating Unit A

In a first variant of the invention, the repeating unit A is obtained from an aminocarboxylic acid comprising from 9 to 12 carbon atoms. It may thus be chosen from 9-aminonanoic acid (denoted 9), 10-aminodecanoic acid (denoted 10), 11-aminoundecanoic acid (denoted 11) and 12-aminododecanoic acid (denoted 12).

Preferentially, the repeating unit A is obtained from 11-aminoundecanoic acid (11).

The unit A is also obtained from a branched aminocarboxylic acid.

The total number of carbon atoms, which corresponds to the sum of the number of carbon atoms in the main chain and of the number of atoms in the branch(es), is between from 12 to 36, advantageously from 15 to 30 and preferentially from 18 to 24.

The main chain of the aminocarboxylic acid advantageously comprises between 6 and 18 carbon atoms and preferentially between 10 and 12 carbon atoms.

By way of example, the main chain may be formed by an aminodecanoic acid, an aminoundecanoic acid or an aminododecanoic acid.

The alkyl branch(es) of the aminocarboxylic acid and of the lactam (c) may be linear and correspond to the formula $C_xH_{2x-1}$, with x being an integer greater than or equal to 1.

It (they) may also be branched.

Use may advantageously be made of N-heptylamino-11-undecanoic acid, which will be denoted "18" since it comprises 18 carbon atoms in total, including 11 on the main chain and 7 on the n-heptyl branch. Other advantageous aminocarboxylic acids are N-heptylamino-12-dodecanoic acid (denoted 19), N-dodecylamino-11-undecanoic acid (denoted 23), N-dodecylamino-12-dodecanoic acid (denoted 24), N-octadecylamino-11-undecanoic acid (denoted 29) and N-octadecylamino-12-dodecanoic acid (denoted 30).

Repeating Unit X.Y

The repeating unit X.Y is a unit obtained from the polycondensation of at least one cycloaliphatic diamine or from at least one linear or branched aliphatic diamine or from at least one arylamine and from at least one dicarboxylic acid.

The molar proportions of cycloaliphatic diamine and of dicarboxylic acid are preferentially stoichiometric.

The linear or branched cycloaliphatic or aliphatic diamine or arylamine and the dicarboxylic acid each comprise from 4 to 36 carbon atoms and advantageously from 6 to 18 carbon atoms.

The cycloaliphatic diamine may be chosen from bis(3,5-dialkyl-4-aminocyclohexyl)methane, bis(3,5-dialkyl-4-aminocyclohexyl)ethane, bis(3,5-dialkyl-4-aminocyclohexyl) propane, bis(3,5-dialkyl-4-aminocyclohexyl)butane, bis(3-methyl-4-aminocyclohexyl)methane or 3.3'-dimethyl-4,4'-diaminodicyclohexylmethane commonly known as "BMACM" or "MACM" (and denoted B hereinbelow) p-bis(aminocyclohexyl)methane commonly known as "PACM" (and denoted P hereinbelow) or Dicykan®, isopropylidenedi(cyclohexylamine) commonly known as "PACP", isophoronediamine (denoted IPD hereinbelow) and 2,6-bis(aminomethyl)norbornane commonly known as "BAMN", or mixtures thereof.

Advantageously, the cycloaliphatic diamine of the unit X.Y is chosen from 3,3'-dimethyl-4,4'-diaminodicyclohexylmethane (B), p-bis(aminocyclohexyl)methane (P) and isophoronediamine (IPD), or mixtures thereof.

In one advantageous embodiment of the invention, the cycloaliphatic diamine of the unit X.Y is a bicycloaliphatic diamine, chosen in particular from 3,3'-dimethyl-4,4'-diaminodicyclohexylmethane (B) and p-bis(aminocyclohexyl) methane (P), or mixtures thereof.

The arylamine may be chosen from meta-xylenediamine (MXD) or para-xylenediamine or mixtures thereof.

The dicarboxylic acid may be chosen from linear or branched aliphatic dicarboxylic acids, cycloaliphatic dicarboxylic acids and aromatic dicarboxylic acids.

Advantageously, the dicarboxylic acid may be chosen from linear aliphatic dicarboxylic acids, cycloaliphatic dicarboxylic acids and aromatic dicarboxylic acids.

When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18), eicosanedioic acid (20), docosanedioic acid (22) and fatty acid dimers containing 36 carbons.

The fatty acid dimers mentioned above are dimerized fatty acids obtained by oligomerization or polymerization of unsaturated monobasic fatty acids bearing a long hydrocarbon chain (such as linoleic acid and oleic acid), as described in particular in document EP 0 471 566.

It is clear that the copolyamide may comprise more than two different repeating units and especially three, then corresponding to the formula A/X.Y/Z in which Z is a unit that is similar to but different from A or a unit that is similar to but different from X.Y.

The semicrystalline transparent polyamide may also be a blend of semicrystalline polyamide and of amorphous polyamide, on the condition that it has a melting point, a heat of fusion ΔH>10 J/g, in particular >12 J/g, with a heating rate of 20 K/min, and also a glass transition temperature as determined by DSC according to standard ISO 11357-1: 2009 and 11357-2 and 3: 2013 at a heating rate of 20 K/min.

Advantageously, said semicrystalline transparent blend may also be a blend of semicrystalline polyamide and of amorphous polyamide and have a transmittance of greater than or equal to 75% as measured at a wavelength of 560 nm and for a plate thickness of 2 mm according to standard ISO 13468-2:2006.

For the purposes of the invention, the term "semicrystalline polyamide" generally means linear aliphatic polyamides whose crystallinity is manifested by the presence of spherolites which are large enough for the material to have a transmittance of less than 75%, at 560 nm on a plate 2 mm thick (according to standard ISO 13468-2:2006).

Mention may be made, for example, of aliphatic polyamides that are of formula A or X.Y as defined above and also the other polyamides provided that they are semicrystalline.

For the purposes of the invention, the term "amorphous polyamides" means amorphous transparent polyamides with a heat of fusion of not more than 3 J/g, preferably not more than 1 J/g, as determined during the second heating in DSC according to 11357-3:2013 at a heating rate of 20 K/Mn.

Regarding the Amorphous Polyamide

This results essentially from the condensation:

either of at least one diamine chosen from cycloaliphatic diamines and aliphatic diamines and of at least one diacid chosen from cycloaliphatic diacids, aliphatic diacids and aromatic diacids, at least one of these diamine or diacid units being cycloaliphatic, or of a cycloaliphatic α,ω-aminocarboxylic acid, or of a combination of these two possibilities, and optionally of at least one monomer chosen from α,ω-aminocarboxylic acids or the optional corresponding lactams, aliphatic diacids and aliphatic diamines, the cycloaliphatic diamines are as defined above.

It would not constitute a departure from the scope of the invention if a PEBA were mixed with said homopolyamide, copolyamide or blend thereof or alternatively with a semicrystalline polyamide or the amorphous polyamide or said blend of semicrystalline polyamide and of amorphous polyamide.

Regarding the PEBA

This results from the copolycondensation of polyamide blocks bearing reactive ends with polyether blocks bearing reactive ends, such as, inter alia:

1) Polyamide blocks bearing diamine chain ends with polyoxyalkylene blocks bearing dicarboxylic chain ends.

2) Polyamide blocks bearing dicarboxylic chain ends with polyoxyalkylene blocks bearing diamine chain ends obtained by cyanoethylation and hydrogenation of α,ω-dihydroxylated aliphatic polyoxyalkylene blocks known as polyether diols.

3) Polyamide blocks bearing dicarboxylic chain ends with polyether diols, the products obtained in this specific case being polyetheresteramides. The copolymers (C) are advantageously of this type.

The polyamide blocks bearing dicarboxylic chain ends originate, for example, from the condensation of α,ω-aminocarboxylic acids, lactams or dicarboxylic acids and diamines in the presence of a chain-limiting dicarboxylic acid.

The number-average molar mass $\overline{Mn}$ of the polyamide blocks is between 300 and 15 000 and preferably between 600 and 5000. The mass $\overline{Mn}$ of the polyether blocks is between 100 and 6000 and preferably between 200 and 3000.

The polymers bearing polyamide blocks and polyether blocks may also comprise randomly distributed units. These polymers may be prepared by the simultaneous reaction of the polyether and of the precursors of the polyamide blocks.

For example, polyether diol, a lactam (or an α,ω-amino acid) and a chain-limiting diacid may be reacted in the presence of a small amount of water. A polymer is obtained essentially having polyether blocks and polyamide blocks of very variable length, but also the various reagents that have reacted randomly, which are distributed randomly along the polymer chain.

These polymers bearing polyamide blocks and polyether blocks, whether they originate from the copolycondensation of polyamide and polyether blocks prepared previously or from a one-step reaction, have, for example, Shore D hardnesses that may be between 20 and 75 and advantageously between 30 and 70 and an intrinsic viscosity of between 0.8 and 2.5 measured in meta-cresol at 25° C. for an initial concentration of 0.8 g/100 ml. The MFI values may be between 5 and 50 (235° C. under a 1 kg load).

The polyether diol blocks are either used in unmodified form and copolycondensed with polyamide blocks bearing carboxylic end groups, or they are aminated to be converted into polyetherdiamines and condensed with polyamide blocks bearing carboxylic end groups. They may also be blended with polyamide precursors and a chain limiter to make polymers bearing polyamide blocks and polyether blocks having randomly distributed units.

Regarding the Nucleating Agent

The term "nucleating agent" should be understood as meaning:

an inorganic nucleating agent, for instance a metal oxide, metal particles, silica, alumina, clay or talc;

an organic nucleating agent, such as an additional polyamide with a melting point ($Tm_2$) higher than the melting point ($Tm_1$) of the polyamide to be nucleated, in particular a melting point $Tm_2 > Tm_1 + 20°$ C., PA 6.6 or polyphthalamides being preferred;

a mixture of the above agents.

Throughout the description, it should be noted that the prepolymer is not a nucleating agent and is consequently excluded from the nucleating agents, in particular as defined above.

Regarding the Prepolymer

The term "prepolymer" refers to polyamide oligomers necessarily with a number-average molecular mass lower than that of the polyamides used in the matrix, in particular said prepolymer with a number-average molecular mass of from 1000 to 15 000 g/mol, in particular from 1000 to 10 000 g/mol.

The prepolymer may be chosen from oligomers of linear or branched aliphatic polyamides, oligomers of cycloaliphatic polyamides, oligomers of semiaromatic polyamides, oligomers of aromatic polyamides, linear or branched aliphatic, cycloaliphatic, semiaromatic and aromatic polyamides having the same definition as above.

The prepolymer or oligomer is consequently derived from the condensation:

of at least one lactam, or
of at least one amino acid, or
of at least one diamine with at least one dicarboxylic acid, or
a mixture thereof.

The prepolymer or oligomer therefore cannot correspond to the condensation of a diamine with a lactam or an amino acid.

The prepolymer may also be a copolyamide oligomer or a blend of polyamide and copolyamide oligomers.

For example, the prepolymer is monofunctional $NH_2$, monofunctional $CO_2H$ or difunctional $CO_2H$ or $NH_2$.

The prepolymer may thus be monofunctional or difunctional, acid or amine, i.e. it contains a single amine or acid end function, when it is monofunctional (in this case the other end group is nonfunctional, especially $CH_3$), or two amine end functions or two acid end functions, when it is difunctional.

Advantageously, the prepolymer is monofunctional, preferably $NH_2$ or $CO_2H$.

It may also be nonfunctional at the two ends, especially $diCH_3$.

Monofunctional $NH_2$ prepolymers may be produced by reacting an alkyl (linear or branched) or aryl monocarboxylic acid after condensation of a lactam or an amino acid or a diamine with a dicarboxylic acid.

$DiNH_2$ prepolymers may be produced by reacting a diamine after condensation of a lactam or an amino acid or a diamine with a dicarboxylic acid.

Monofunctional $CO_2H$ prepolymers may be produced by reacting an alkyl (linear or branched) or aryl monocarboxylic acid after condensation of a lactam or an amino acid or a diamine with a dicarboxylic acid.

$DiCO_2H$ prepolymers may be produced by reacting a dicarboxylic acid after condensation of a lactam or an amino acid or a diamine with a dicarboxylic acid.

Non-functional $diCH_3$ prepolymers may be produced by reacting the amine end groups of the prepolymer with an alkyl monocarboxylic acid and acid end groups with an alkyl amine.

It should be noted that the prepolymer is not in mixture with an additive such as alumina silicate.

It should be noted that the prepolymer is added to said polyamide only for the purpose of accelerating the crystallization and not to improve the overmolding when said polyamide is overmolded especially with a thermoplastic polyurethane.

Regarding the Additives

The composition may also comprise at least one additive chosen from impact modifiers, modifiers of core-shell type, antistatic fillers, lubricants, lubricants, dyes, pigments, optical brighteners, antioxidants, flame retardants, fibers, in particular aramid fibers, glass fibers, carbon fibers, advantageously glass fibers, fillers, in particular silica, graphite, expanded graphite, carbon black, glass beads, kaolin, magnesia, slag, talc, wollastonite, nanofillers (carbon nanotubes) and stabilizers.

It should be noted that the additives cannot be photochromic dyes.

It should be noted that the composition after addition of the additives must conserve its transparency properties.

The customary stabilizers used with polymers are phenols, phosphites, UV absorbers, HALS-type stabilizers (Hindered Amine Light Stabilizer), metal iodides, etc. Mention may be made of Irganox 1010, 245, 1098, Irgafos 168, Tinuvin 312, and Iodide P201 from the company Ciba.

The term "impact modifier" should be understood as meaning a polyolefin base with a flexural modulus of less than 100 MPa measured according to standard ISO-178: 2010 and a Tg of less than 0° C. (measured according to standard 11357-2 at the inflection point of the DSC thermogram), in particular a polyolefin, optionally coupled with a PEBA having a flexural modulus <200 MPa.

The polyolefin of the impact modifier may be functionalized or nonfunctionalized or be a mixture of at least one functionalized and/or at least one nonfunctionalized.

In particular, a portion or all of the polyolefins bears a function chosen from carboxylic acid, carboxylic anhydride and epoxide functions, and is in particular chosen from a copolymer of ethylene and propylene with elastomeric character (EPR), an ethylene-propylene-diene copolymer with elastomeric character (EPDM) and an ethylene/alkyl (meth)acrylate copolymer, an ethylene-higher alkene copolymer, in particular an ethylene-octene copolymer, or an ethylene-alkyl acrylate-maleic anhydride terpolymer.

Advantageously, the impact modifier is chosen from F493, a Lotader®, in particular Lotader 5500 or Lotader 7500, VA1803, or a mixture thereof; in this case they are in a ratio ranging from 0.1/99.9 to 99.9/0.1, preferentially 1/2 to 2/1 when they are in a mixture of two.

By way of example, the impact modifier is chosen from the following mixtures: F493/Lotader®, in particular F493/Lotader® 5500 or F493/Lotader® 7500.

The term "modifier of core-shell type" is also denoted "copolymer of core-shell type".

The "modifier of core-shell type" is in the form of fine particles with an elastomer core and at least one thermoplastic shell; the size of the particles is generally less than a micrometer and advantageously between 150 and 500 nm.

The "modifier of core-shell type" has an acrylic or butadiene base, unlike the impact modifier which has a polyolefin base.

Examples of cores that may be mentioned include isoprene or butadiene homopolymers, copolymers of isoprene with not more than 30 mol % of a vinyl monomer and copolymers of butadiene with not more than 30 mol % of a vinyl monomer. The vinyl monomer may be styrene, an alkylstyrene, acrylonitrile or an alkyl (meth)acrylate. Another core family is constituted by homopolymers of an alkyl (meth)acrylate and copolymers of alkyl (meth)acrylate with not more than 30 mol % of a vinyl monomer. The alkyl (meth)acrylate is advantageously butyl acrylate. The vinyl monomer may be styrene, an alkylstyrene, acrylonitrile, butadiene or isoprene. The core of the copolymer (A) may be totally or partly crosslinked. It suffices to add at least difunctional monomers in the course of preparation of the core; these monomers may be chosen from poly(meth) acrylic esters of polyols such as butylene di(meth)acrylate and trimethylolpropane trimethacrylate. Other difunctional monomers are, for example, divinylbenzene, trivinylbenzene, vinyl acrylate and vinyl methacrylate. The core may also be crosslinked by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate.

The shell(s) are homopolymers of styrene, of an alkylstyrene or of methyl methacrylate or copolymers comprising at least 70% of one of these preceding monomers and at least one comonomer chosen from the other preceding monomers, vinyl acetate and acrylonitrile. The shell may also be functionalized by introducing therein, by grafting or as comonomer during the polymerization, unsaturated functional monomers such as unsaturated carboxylic acid anhydrides, unsaturated carboxylic acids and unsaturated epoxides. Examples that may be mentioned include maleic anhydride, (meth)acrylic acid and glycidyl methacrylate. By way of example, mention may be made of core-shell copolymers (A) having a polystyrene shell and core-shell copolymers (A) having a PMMA shell. Core-shell copolymers (A) having two shells, one made of polystyrene and the exterior one made of PMMA, also exist. Examples of copolymer (A) and also of the process for preparing them are described in the following patents: U.S. Pat. Nos. 4,180,494, 3,808,180, 4,096,202, 4,260,693, 3,287,443, 3,657,391, 4,299,928, 3,985,704.

The "modifier of core-shell type" is thus different from the polyolefin of the impact modifier, especially in that the impact modifier reacts with the the polyamide matrix, whereas the core-shell does not react therewith since the core of the latter is capable of reacting only with the shell thereof.

The Applicant thus found, surprisingly, that the use of a prepolymer in a semicrystalline transparent polyamide composition made it possible to improve the crystallization kinetics and to reduce the warpage of said composition while at the same time conserving or improving its transparency properties (transmittance and haze) and also its mechanical properties (impact strength as determined according to ISO 179-1:2010 eA, the modulus as determined according to ISO 178:2010 and the Ross flex), when compared with the same composition free of prepolymer, said composition being moreover free of nucleating agent.

The prepolymer thus accelerates the crystallization of the semicrystalline transparent polyamide without disrupting the transparency, which allows said composition to have better size stability with a prepolymer than without prepolymer or than with a nucleating agent, at a content allowing the transparency to be conserved >75% at 2 mm. Specifically, in the absence of prepolymer without nucleating agent, the composition continues to crystallize during a heat treatment and especially during decoration, which induces warpage.

In the presence of the nucleating agent alone, the crystallization is accelerated, but the nucleating agent has a negative impact on the optical properties of the semicrystalline transparent polyamide. When the nucleating agent is introduced in a content allowing the transparency to be conserved >75% at 2 mm, the composition then continues to crystallize during a heat treatment and especially during decoration, which induces warpage.

It should be noted that the composition of the invention comprising the semicrystalline transparent polyamide and the prepolymer has the same transparency as said semicrystalline transparent polyamide, and such is the case whether or not said composition comprises an additive.

Advantageously, the composition with which said prepolymer is used, as defined above, comprises:
said matrix constituted of said at least one semicrystalline transparent polyamide in a proportion of from 60 to 99.95% by weight, in particular from 50 to 99.95%;
said prepolymer in a proportion of 0.05% to 20% by weight;
the weight proportion of polyamide matrix and that of prepolymer being, respectively, from 60% to 99.9% and from 40% to 0.1%, relative to the sum of semicrystalline transparent polyamide-prepolymer; and
said additive in a weight proportion of 0 to 20%;
the sum of the semicrystalline transparent polyamide, of the prepolymer and optionally of the additive being equal to 100%.

Throughout the description, all the percentages of the various constituents of the composition are given on a weight basis, unless otherwise indicated.

Advantageously, said matrix defined above is constituted of at least one semicrystalline transparent homopolyamide; in particular, said semicrystalline transparent homopolyamide has a transmittance of greater than or equal to 75% as measured at a wavelength of 560 nm and for a plate thickness of 2 mm according to standard ISO 13468-2:2006.

Advantageously, said semicrystalline transparent homopolyamide is of formula X.Y, chosen in particular from P.10, B.10, P.12, B.12, MXD.6, MXD.10, PXD.10, MXD.12 and PXD.12.

Advantageously, said matrix defined above is constituted of at least one semicrystalline transparent copolyamide; in particular, said semicrystalline transparent copolyamide has a transmittance of greater than or equal to 75% as measured at a wavelength of 560 nm and for a plate thickness of 2 mm according to standard ISO 13468-2:2006.

Advantageously, said semicrystalline transparent copolyamide is of formula A/X.Y.

Advantageously, the molar proportion of repeating unit A in said semicrystalline transparent copolyamide of formula A/X.Y is from 91% to less than 100%. Consequently, the molar content of repeating unit X.Y is less than or equal to 9%.

Specifically, it is observed that at and above 91% molar content of repeating unit A in the copolyamide A/X.Y, the repeating units A and X.Y being as defined above, the stiffness, transparency and fatigue criteria are achieved, irrespective of the transformation conditions. In particular, implementation by molding is entirely satisfactory: no warpage of the molded mass is observable. For a molar content of less than 91%, it is observed, on the other hand, that the copolyamide no longer satisfies the Ross flex fatigue test.

Advantageously, the unit A in a molar proportion from 95% to less than 100% and the unit X.Y in a molar proportion from more than 0 to less than 5%.

Advantageously, the repeating unit A in said semicrystalline transparent copolyamide of formula A/X.Y is a PA11 or PA12, the unit X.Y being a homopolyamide comprising a cycloaliphatic diamine; in particular, the unit X.Y is chosen from B.I (I corresponding to isophthalic acid), B.10, P.10, B.12 and P.12.

Advantageously, said semicrystalline transparent copolyamide is of formula A/X.Y/Z.W in which A and X.Y are as defined above and Z.W are as defined for X.Y on condition that Z.W is different from X.Y.

Advantageously, the molar proportion of repeating unit A in said semicrystalline transparent copolyamide of formula A/X.Y/Z.W is from 91% to less than 100%. Consequently, the molar content of repeating unit X.Y and Z.W is less than or equal to 9% on condition that the molar content of each of the repeating units X.Y or Z.W is greater than 0.

Advantageously, the repeating unit A in said semicrystalline transparent copolyamide of formula A/X.Y/Z.W is a PA11 or PA12, the unit X.Y being a homopolyamide comprising a cycloaliphatic diamine; in particular, the unit X.Y is chosen from B.I (I corresponding to isophthalic acid), B.10, P.10, B.12 and P.12 and the unit Z.W being a homopolyamide comprising a cycloaliphatic diamine; in particular, the unit X.Y is chosen from B.I (corresponding to isophthalic acid), B.10, P.10, B.12 and P.12 on condition that X.Y is different from Z.W.

Advantageously, the semicrystalline transparent polyamide and the prepolymer must be mutually compatible, i.e. there is no macroscopic phase separation when they are mixed together.

Advantageously, in the composition of the invention, the prepolymer is chosen from long-chain polyamides and is compatible with the polyamide of the matrix; in particular the polyamide of the matrix is chosen from long-chain polyamides, in particular aliphatic, semiaromatic or cycloaliphatic.

Advantageously, said prepolymer corresponds to a polyamide, in particular an aliphatic polyamide, especially chosen from PA6, PA11, PA12, PA11/6 and PA6/12 or a blend thereof.

Advantageously, a single prepolymer is used in the composition.

Said prepolymer used in a composition of the invention may have a number-average molecular mass of from 1000 to 15 000 g/mol, especially from 1000 to 13 000 g/mol, especially from 1000 to 10 000 g/mol, especially from 1000 to 9000 g/mol, especially from 1000 to 8000 g/mol, especially from 1000 to 7000 g/mol, especially from 1000 to 6000 g/mol, especially from 1000 to 5000 g/mol, especially from 2000 to 5000 g/mol, especially from 2000 to 4000 g/mol, especially from 2000 to 3000 g/mol.

Advantageously, the weight proportion of prepolymer is from 0.1% to 20%, especially from 1% to 20% by weight, preferentially from 1% to 15%, more preferentially from 1% to 10%, even more preferentially from 1% to 5% by weight, relative to the total weight of the composition.

Advantageously, the weight proportion of prepolymer is from 1% to 30%, especially from 3% to 25%, relative to the weight of semicrystalline transparent prepolymer-polyamide.

The prepolymer may comprise a number of carbons per nitrogen atom that is different from that of the semicrystalline transparent polyamide, or identical to that of the semicrystalline transparent polyamide or else close to that of the semicrystalline transparent polyamide.

The semicrystalline transparent polyamide and the prepolymer may thus both be long-chain or both be short-chain or else the semicrystalline transparent polyamide is long-chain and the prepolymer short-chain, or the semicrystalline transparent polyamide is short-chain and the prepolymer is long-chain.

Advantageously, the prepolymer used is constituted of PA11.

Advantageously, the prepolymer is used in a composition in which the additives are chosen from impact modifiers, modifiers of core-shell type, stabilizers, dyes, plasticizers, flame retardants, fibers and fillers.

Advantageously, the prepolymer is used in a composition in which the additives are chosen from modifiers of core-shell type, stabilizers, dyes, plasticizers, flame retardants, fibers and fillers.

Advantageously, the prepolymer is used in a composition in which the additives are chosen from stabilizers, dyes, plasticizers, flame retardants, fibers and fillers.

Advantageously, the prepolymer is chosen from a $diCH_3$, $diNH_2$, $monoNH_2$, monoacid, diacid and amino acid prepolymer.

For example, the prepolymer is $monoNH_2$ or monoacid or diacid.

According to another aspect, the present invention relates to a composition comprising:

from 60 to 99.95% by weight, in particular from 55 to 99.95% by weight, of at least one semicrystalline transparent copolyamide;

from 0.05% to 20% by weight of at least one prepolymer, the weight proportion of polyamide and that of prepolymer being, respectively, from 60% to 99.9% and from 40% to 0.1%, relative to the sum of polyamide-prepolymer;

from 0 to 20% of an additive;

said composition being free of nucleating agent and of impact modifier.

With the exception of the absence of impact modifier, including as additive, all the characteristics of the semicrystalline transparent copolyamide compositions defined in the use of the prepolymer are valid for the compositions per se.

Advantageously, said composition comprises a semicrystalline transparent copolyamide with a transmittance of greater than or equal to 75% as measured at a wavelength of 560 nm and for a plate thickness of 2 mm according to standard ISO 13468-2:2006.

Advantageously, said composition comprises a semicrystalline transparent copolyamide of formula A/X.Y, in particular with a transmittance of greater than or equal to 75% as measured at a wavelength of 560 nm and for a plate thickness of 2 mm according to standard ISO 13468-2:2006, in which the molar proportion of unit A in the copolyamide A/X.Y is greater than or equal to 91%.

Advantageously, the molar proportion of unit A in said semicrystalline transparent copolyamide A/X.Y of said composition is from 95% to less than 100%.

Advantageously, the unit A of said semicrystalline transparent copolyamide of formula A/X.Y of said composition is a PA11 or PA12, the unit X.Y being a homopolyamide comprising a cycloaliphatic diamine; in particular, the unit X.Y is chosen from P.10, B.10, P.12, B.12, MXD.6, MXD.10, PXD.10, MXD.12 and PXD.12.

Advantageously, said composition of the invention comprises a semicrystalline transparent copolyamide of formula A/X.Y/Z.W, in particular with a transmittance of greater than or equal to 75% as measured at a wavelength of 560 nm and for a plate thickness of 2 mm according to standard ISO 13468-2:2006, in which A and X.Y are as defined above and Z.W are as defined for X.Y on condition that Z.W is different from X.Y.

Advantageously, the molar proportion of repeating unit A in said semicrystalline transparent copolyamide of formula A/X.Y/Z.W of said composition of the invention is from 91% to less than 100%. Consequently, the molar content of repeating unit X.Y and Z.W is less than or equal to 9% on condition that the molar content of each of the repeating units X.Y or Z.W is greater than 0.

Advantageously, the repeating unit A in said semicrystalline transparent copolyamide of formula A/X.Y/Z.W of said composition of the invention is a PA11 or PA12, the unit X.Y being a homopolyamide comprising a cycloaliphatic diamine; in particular, the unit X.Y is chosen from B.I (I corresponding to isophthalic acid), B.10, P.10, B.12 and P.12 and the unit Z.W being a homopolyamide comprising a cycloaliphatic diamine; in particular, the unit X.Y is chosen from B.I (corresponding to isophthalic acid), B.10, P.10, B.12 and P.12 on condition that X.Y is different from Z.W.

Advantageously, said composition comprises a prepolymer that is compatible with said polyamide.

Advantageously, said composition comprises a prepolymer which corresponds to a polyamide, in particular an aliphatic polyamide, especially chosen from PA6, PA11, PA12, PA11/6 and PA6/12 or a blend thereof.

Advantageously, the prepolymer present in the composition of the invention has a number-average molecular mass from 1000 to 15 000 g/mol, in particular from 1000 to 13 000 g/mol, especially from 1000 to 10 000 g/mol, preferably from 1000 to 5000 g/mol.

Advantageously, the prepolymer present in said composition of the invention is in a weight proportion of prepolymer of from 0.1% to 20%, especially from 1% to 20%, especially from 3% to 15%, relative to the total of the composition.

Advantageously, the weight proportion of prepolymer present in said composition of the invention is from 1% to 30%, especially from 3% to 25%, relative to the weight of prepolymer-polyamide.

Advantageously, the prepolymer present in said composition of the invention is constituted of PA11.

Advantageously, the additives of said composition are chosen from modifiers of core-shell type, stabilizers, dyes, plasticizers, flame retardants, fibers and fillers.

Advantageously, the composition of the invention comprises:
- from 60 to 99.85% by weight, in particular from 55 to 99.85% by weight, of a matrix constituted of at least one semicrystalline transparent copolyamide;
- from 0.05% to 20% by weight of at least one prepolymer, the weight proportion of polyamide matrix and that of prepolymer being, respectively, from 60% to 99.9% and from 40% to 0.1%, relative to the sum of transparent polyamide-prepolymer;
- from 0.1 to 20% of at least one additive chosen from modifiers of core-shell type, stabilizers, dyes, plasticizers, flame retardants, fibers and fillers;
- the sum of the weight percentages of matrix, prepolymer and additive being equal to 100,
- said composition being free of nucleating agent and of impact modifier.

Advantageously, the semicrystalline transparent copolyamide of this latter composition has a transmittance of greater than or equal to 75% and is 11/B.I.

According to another aspect, the invention relates to the use of a composition as defined above, for the manufacture of articles obtained by extrusion, injection or molding.

The articles obtained by extrusion may be films or sheets for subsequent thermoforming, or alternatively pipes or tubes for the distribution of fluids, especially of petrol, compressed air or refrigerant fluid.

The articles obtained by injection are for example sports articles, in particular sports shoes and especially ski boots, football boots or running shoes.

According to another aspect, the present invention relates to a process for preparing articles as defined above, comprising a step of extrusion, injection or molding of the composition defined above.

According to another aspect, the present invention relates to the articles as obtained by the process defined above.

According to another aspect, the present invention relates to a process for preparing a composition, comprising placing a prepolymer in contact with at least one semicrystalline transparent polyamide and optionally at least one additive, said polyamide being present in a proportion of from 60% to 99.95% by weight, in particular from 55% to 99.95% by weight;

said prepolymer being present in a proportion of 0.05% to 20% by weight;

the weight proportion of polyamide and that of prepolymer being, respectively, from 60% to 99.9% and from 40% to 0.1%, relative to the sum of polyamide-prepolymer;

said additive being in a weight proportion of 0 to 20%;

the sum of the polyamide, the prepolymer and optionally the additive being equal to 100%, said composition being free of nucleating agent, said composition having improved crystallization kinetics and reduced warpage while at the same time conserving or improving its transparency properties and also its mechanical properties, when compared with the same composition free of prepolymer.

The polyamide composition used in the invention may be prepared by compounding the transparent polyamide of the matrix, the prepolymer and optionally the additive, optionally a mold-release agent and also other optional components. The composition is usually recovered in the form of pellets or granules.

The polyamide composition used in the invention may also be prepared by dry blending.

DESCRIPTION OF THE FIGURES

FIG. 1 shows the DSC thermogram (differential scanning calorimetry according to standard 11357-1 to 3: 2013) of plates injected with BMVO with and without oligomer PA11 (Mn=2500 g/mol) and for a mold temperature of 30° C. (top curve) and 70° C. (three other curves, from top to bottom). The comparison is made on the first heating.

x axis: Heat flow (W/g)
y axis: Temperature (° C.)
Curves from top to bottom:
0% prepolymer PA11 and 100% BMVO (matrix). Mold temperature of 30° C.
0% prepolymer PA11 and 100% BMVO (matrix). Mold temperature of 70° C.
5% prepolymer PA11 and 100% BMVO (matrix) Mold temperature of 70° C.
10% prepolymer PA11 and 100% BMVO (matrix). Mold temperature of 70° C.

It is noted that with a hot mold (70° C.) and better still with the addition of 5 or 10% of oligomer PA11, after the Tg (50° C.), the heat of recrystallization at 60-65° C. decreases or even disappears.

BMVO (11/B.I having a proportion of PA11 of greater than 91 mol % and less than 100 mol % and a proportion of B.I of less than 9% and greater than 0%, produced by the Applicant).

Figure 2:
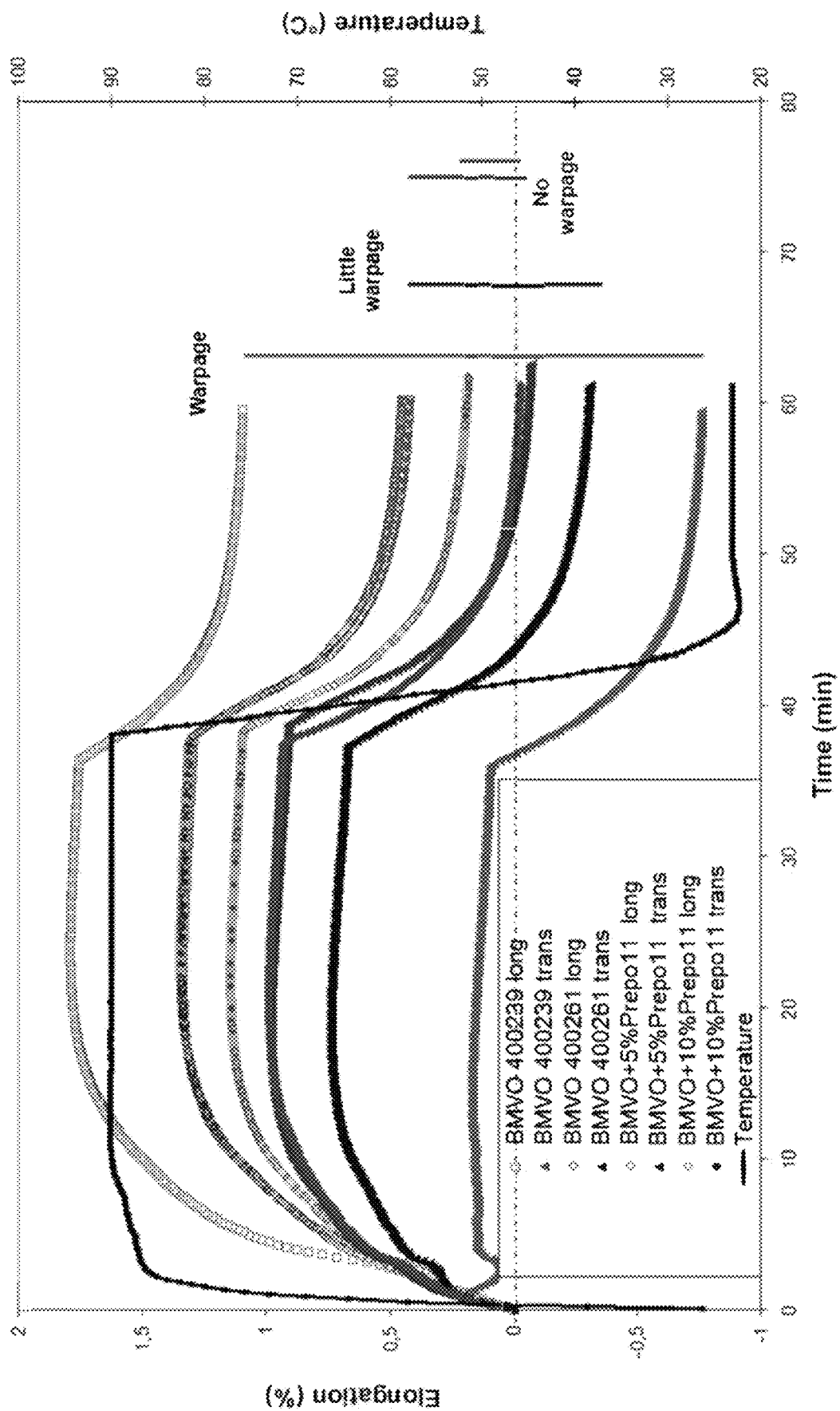
FIG. 2 shows dynamic mechanical analysis curves of certain examples according to the invention and comparative examples not according to the invention.

FIG. 2 shows the DMA (dynamic mechanical analysis) curves of longitudinal and transverse expansion of BMVO samples injected and then heated to 90° C. in the DMA machine.

The expansion and/or the warpage is measured by the longitudinal and transverse movements of the part. It is considered that the warpage of the part will be proportional to the difference of the longitudinal and transverse movements after cooling of the part.

x axis: Time (min)
y axis: Elongation (%)
From top to bottom:
1) 0% prepolymer PA11 and 100% BMVO (matrix). Mold temperature of 30° C. Longitudinal movement of the part.
2) 5% prepolymer PA11 and 95% BMVO (matrix). Mold temperature of 70° C. Longitudinal movement of the part.
3) 0% prepolymer PA11 and 100% BMVO (matrix). Mold temperature of 70° C. Longitudinal movement of the part.
4) 10% prepolymer PA11 and 90% BMVO (matrix). Mold temperature of 70° C. Longitudinal movement of the part.
5) 10% prepolymer PA11 and 90% BMVO (matrix). Mold temperature of 70° C. Transverse movement of the part.
6) 5% prepolymer PA11 and 95% BMVO (matrix). Mold temperature of 70° C. Transverse movement of the part.
7) 0% prepolymer PA11 and 100% BMVO (matrix). Mold temperature of 70° C. Transverse movement of the part.
8) 0% prepolymer PA11 and 100% BMVO (matrix). Mold temperature of 30° C. Transverse movement of the part.
9) Temperature It is noted in FIG. 2 that BMVO injected into a cold mold (30° C., curves 1) and 9)) shows substantial warpage. When 5% and 10%, respectively, of prepolymer PA11 (Mn=2500 g/mol) are added to the BMVO, the warpage decreases greatly.

BMVO (11/B.I having a proportion of PA11 of greater than 91 mol % and less than 100 mol % and a proportion of B.I of less than 9% and greater than 0%, produced by the Applicant).

Figure 3:
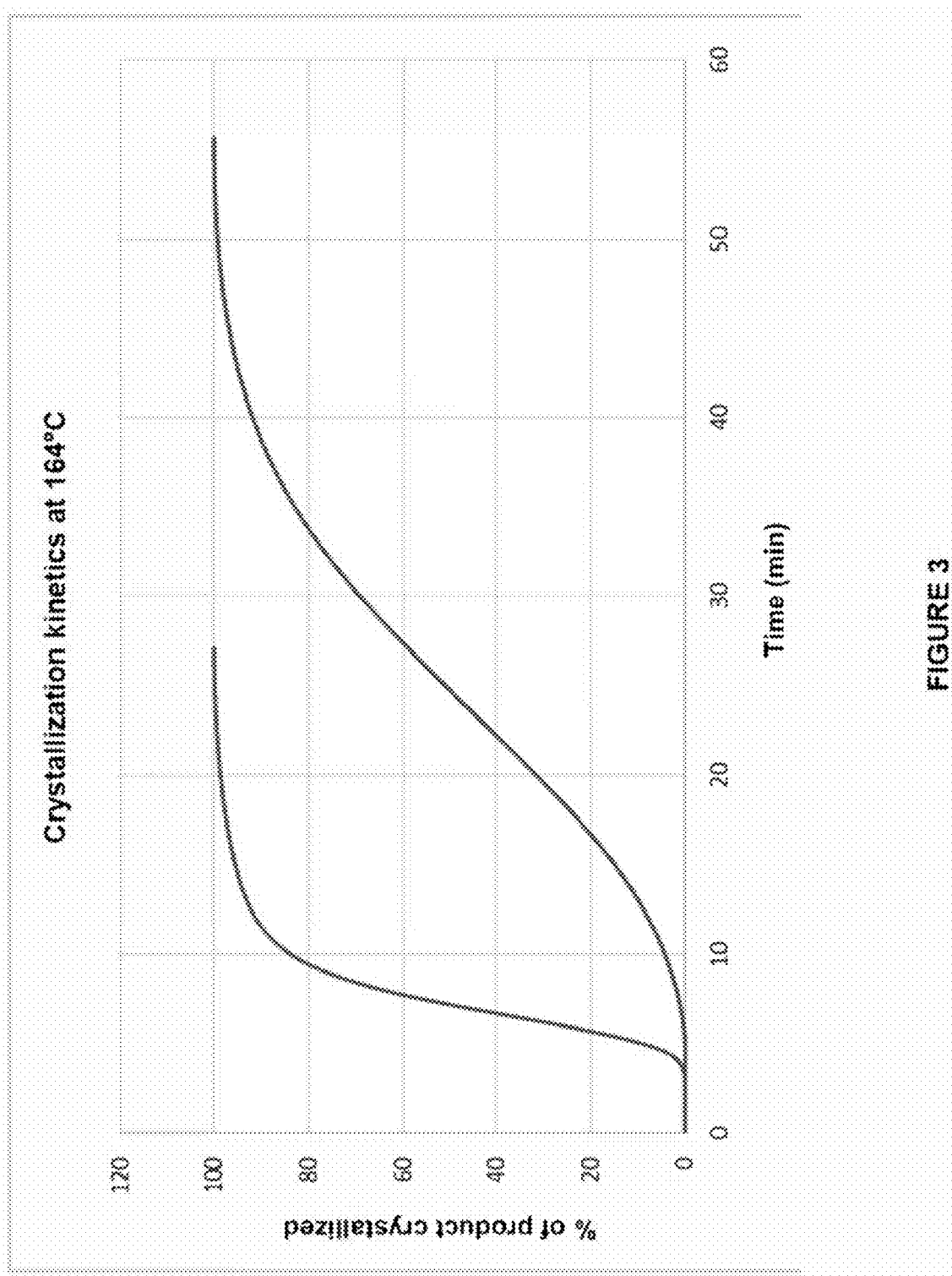
FIG. 3 shows crystallization kinetics for certain examples according to the invention and comparative examples not according to the invention.

FIG. 3 shows the comparison of the crystallization kinetics for 100% BMVO without prepolymer (right-hand curve) with that of BMVO (95%) plus 5% of prepolymer PA11 (Mn=2500 g/mol) (left-hand curve) performed at 164° C. (measured according to ISO 11357-7: 2013).

The difference obtained in the time for half-crystallization at 164° C. (25 minutes without prepolymer as opposed to 6 minutes with 5% of prepolymer) is noted.

See also table IV of example 2.

Figure 4:
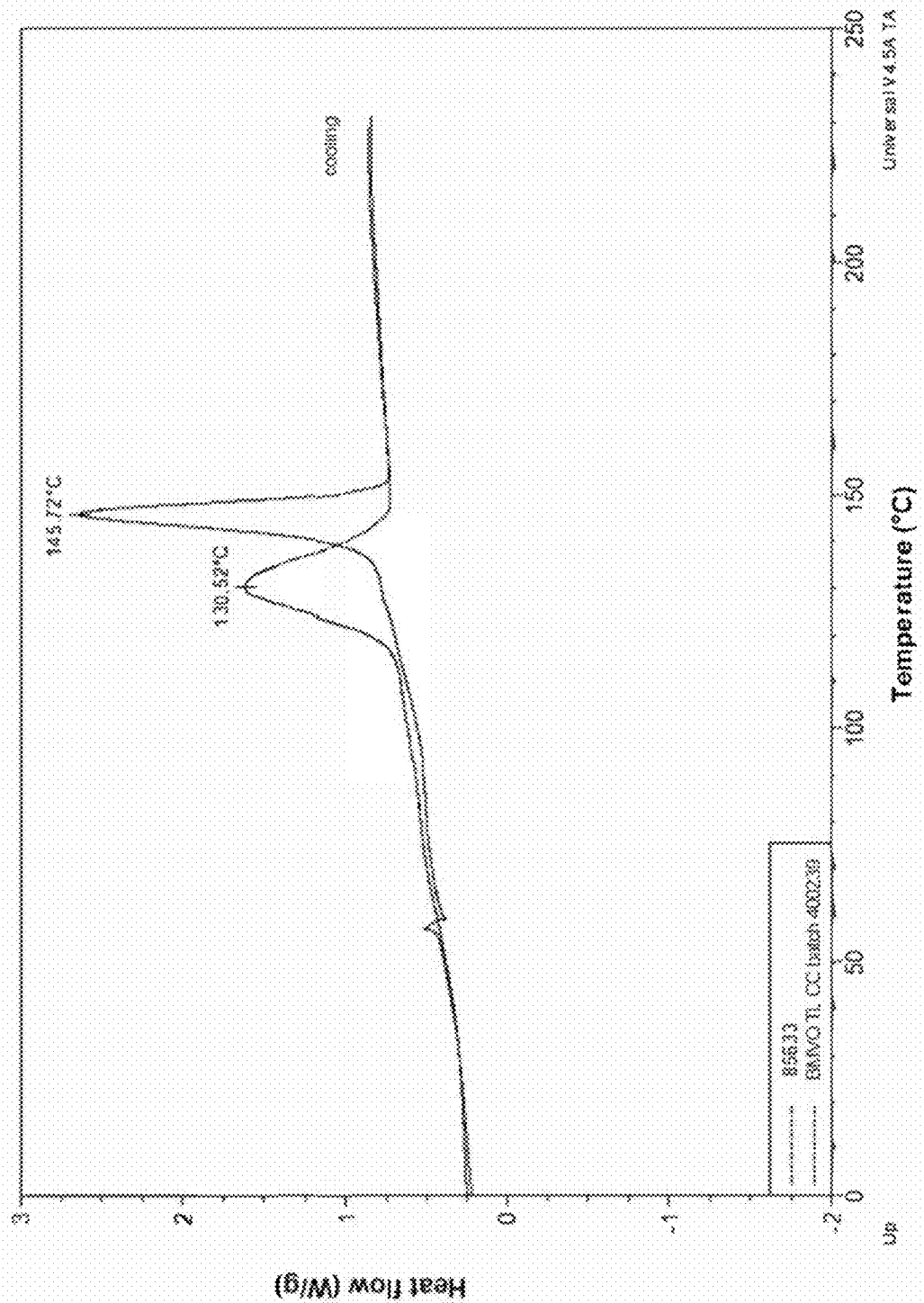
FIG. 4 shows crystallization temperatures for certain examples according to the invention and comparative examples not according to the invention.

FIG. 4 shows the comparison of the crystallization temperature of 100% BMVO without prepolymer (peak at 130.52° C.) and of BMVO (95%) with 5% of prepolymer PA11 (Mn=2500 g/mol) (peak at 145.72° C.) measure according to ISO 11357-3: 2013.

EXAMPLES

Products Used:
BMVO (11/B.I having a proportion of PA11 of greater than 91 mol % and less than 100 mol % and a proportion of B.I of less than 9% and greater than 0%, produced by the Applicant).

Prepolymers: polyamide-11, mono $NH_2$, monoacid or diacid chain end, Mn 2500 g/mol (produced by the applicant).

The following compositions are exemplified:
Compositions of the Invention Based on PA11
 A BMVO polyamide
 A monofunctional $NH_2$, monoacid or diacid prepolymer 11 of mass 2500 g/mol.

Example 1

100% BMVO
95% BMVO+5% monofunctional $NH_2$ PA11 prepolymer
90% BMVO+10% monofunctional $NH_2$ PA11 prepolymer Compounding:
PA11-Based Formulation:
Twin-screw extruder of Leistriz LZT 34 mm type
Machine temperature: 270° C.
Screw speed: 300 rpm
Flow rate at extruder outlet: 15 kg/h
Transformation:
80×10×4 $mm^3$ plates were produced by injection molding.
The following process parameters were used:
PA11-Based Formulation:
 Injection temperature (feed/nozzle): 250/270° C.
 Mold temperature: 70° C.
 Hold time: 20 seconds
 Material hold pressure: 450 bar.
 Cooling time: 15 seconds
100×100×1 $mm^3$ plates were produced by injection molding.
The following process parameters were used:
PA11-Based Formulation:
 Injection temperature (feed/nozzle): 250/270° C.
 Mold temperature: 70° C.
 Hold time: 8 seconds
 Material hold pressure: 1100 bar.
 Cooling time: 35 seconds The results for the viscosities of the compositions, the flexural moduli and the notched impact for the bars obtained are given in table I below:

TABLE I

|  | Flexural modulus (room temperature) MPa | Notched impact −10° C. (kJ/$m^2$) |
| --- | --- | --- |
| 100% BMVO | 1264 | 6.7 |
| 95% BMVO + 5% PA11 prepolymer | 1271 | 7 |
| 90% BMVO + 10% PA11 prepolymer | — | — |

The results for the transmittance measured at 560 nm on a plate 1 and 2 mm thick (2 mm according to standard ISO 13468-2:2006), and for the Haze (measured according to standard D1003-97) are presented in table II.

TABLE II

|  | Haze (D1003-97) (C.) | Tr 560 nm |
| --- | --- | --- |
| BMVO 2 mm | 23 | 79 |
| Dry blend 95% BMVO + 5% PA11 prepolymer 2 mm | 29 | 75 |
| Compound 95% BMVO + 5% PA11 prepolymer 2 mm | 29 | 78 |
| Compound 99.9% BMVO + 0.1% talc 2 mm | 62 | 64 |
| Dry blend 95% BMVO + 5% PA11 prepolymer 1 mm | 9 | 87 |
| Compound 99.9% BMVO + 0.1% talc 1 mm | 20 | 81 |
| Compound 95% BMVO + 5% PA11 prepolymer 1 mm | 10 | 87 |
| Compound 99.9% BMVO + 0.1% Bruggolen P22 1 mm | 21 | 81 |
| BMVO 1 mm | 11 | 86 |

Tr: transmittance
mono NH2 PA11 prepolymer defined above.

Table II shows that the addition of prepolymer (5% by weight of monoNH2 PA11 oligomer), whether as a compound or as a dry blend, advantageously as a compound, does not modify or even improve the transparency properties of the polyamide (Haze and transmittance).

When compared with a talc-based nucleating system, of concentration optimized at 0.1% by weight (haze/transparency/warpage compromise), it is concluded that there is a net advantage of the system based on monoNH2 PA11 oligomer, whether as regards the Haze or the transmittance. The same conclusion is drawn when compared with an organic nucleating system such as Bruggolen® P22.

Optical microscopy analyses (the observations are undertaken on sections of about 1 μm in phase contrast mode (polarized light not available at the time of the analyses)) show that the addition of 5 or 10% of monoNH2 PA11 oligomer leads to crystallinity that is more heterogeneous and coarser at the core, but leads to less skin effect with an amorphous zone passing from about 70 μm to less than 10 μm (see Table III).

TABLE III

|  | skin thickness (μm) at t0 |
| --- | --- |
| Ref BMVO Tmold 30° C. | 100 |
| BMVO Tmold 70° C. | 70 |
| BMVO + 5% PA 11 prepolymer Tmold 70° C. | 8 |
| BMVO + 10% PA 11 prepolymer Tmold 70° C. | 8 |

Example 2

Comparison of the crystallization kinetics of 100% BMVO without prepolymer with that of BMVO (95%) with 1, 2, 3, 4, 5 or 10% of monoNH2 PA11 prepolymer (Mn=2500 g/mol) or with Brueggeman P22 (polyamide/alumina silicate mixture 90/10 by weight) or even with an $NH_2$- and $CO_2H$-terminated difunctional PA11 prepolymer (Mn=2500 g/mol) was performed at 164° C. (measured according to ISO 11357-7: 2013).

Table IV shows the Tc values measured according to ISO 11357-3: 2013 and the crystallization half-time at 164° C. (measured according to ISO 11357-7: 2013).

TABLE IV

|  | Tc (° C.) | Crystallization half-time at 164° C. |
| --- | --- | --- |
| Raw polymerization BMVO | 131 | 25 |
| BMVO + 1% monoNH2 PA11 prepolymer | 146 | 8 |
| BMVO + 2% monoNH2 PA11 prepolymer | 146 | 8 |
| BMVO + 3% monoNH2 PA11 prepolymer | 146 | 8 |
| BMVO + 4% monoNH2 PA11 prepolymer | 146 | 7 |
| BMVO + 5% monoNH2 PA11 prepolymer | 146 | 6 |
| BMVO + 10% monoNH2 PA11 prepolymer | 146 | 6 |
| BMVO + 0.1% talc | 152 | 5 |
| BMVO + 0.1% Bruggolen P22 | 152 | 7 |

Table IV shows that the addition of a prepolymer to a polyamide, in a weight proportion of from 1 to 10% very markedly accelerates the crystallization kinetics.

Examples 3 and 4

Examples 1 and 2 were repeated using a monofunctional acid or difunctional diacid prepolymer.

The results obtained are similar to those of examples 1 and 2.

Example 5

Comparison of the warpage of a monofunctional $NH_2$ prepolymer and of a difunctional $NH_2$ and $CO_2H$ prepolymer used with BMVO on injection, or on annealing at a temperature above the Tg of the corresponding polyamide and PA11 prepolymer blend.

|  | Injection | Annealing |
| --- | --- | --- |
| BMVO | − | −− |
| BMVO + 5% $NH_2$ and $CO_2H$ PA 11 prepolymer | + | − |
| BMVO + 5% mono $NH_2$ PA11 prepolymer | ++ | ++ |

−− means that the blend warps substantially after annealing
− means that the blend warps slightly (after annealing or during injection)
+ means that the blend is molded and is released from the mold correctly without major deformation
++ means that the blend is molded and is released from the mold correctly without any deformation and does not warp after annealing.

The difunctional $NH_2$ and $CO_2H$ PA11 prepolymer, although decreasing the warping of BMVO on injection or on annealing, does not, however, make it possible to eliminate it totally, especially on annealing, in contrast with the mono $NH_2$ monofunctional prepolymer.

The invention claimed is:

1. A method for improving the crystallization kinetics and limiting the warping of a composition, wherein said method comprises a step of dry blending at least one prepolymer having a number-average molecular mass of from 1000 to 10 000 g/mol into a composition to form a prepolymer-polyamide, wherein said prepolymer is a monofunctional acid or monofunctional amine wherein the composition comprises:
    a matrix comprising at least one semicrystalline transparent polyamide, and
    optionally at least one additive,
    wherein the composition possesses a crystallization half-time at 164° C. as measured according to ISO 11357-7:2013 that is from 6 to 8 minutes, wherein the warpage of the composition is limited to a change in elongation that is from 0 to 0.5% after 60 minutes after being heated at 90° C.,
    wherein the transparency properties and the mechanical properties of the composition are either improved or conserved, when compared with the same composition that is free of the prepolymer,
    wherein the composition is also free of nucleating agent.

2. The method according to claim 1, wherein said at least one semicrystalline transparent polyamide has a transmittance >75% (measured at a wavelength of 560 nm and for a plate thickness of 2 mm).

3. The method according to claim 1, wherein said prepolymer-polyamide comprises
    said matrix constituted of said at least one semicrystalline transparent polyamide in a proportion of from 60 to 99.95% by weight;
    said prepolymer in a proportion of 0.05% to 20% by weight;
    wherein the weight proportion of the semicrystalline transparent polyamide matrix and that of the prepolymer is, respectively, from 60% to 99.9% and from 40% to 0.1%, relative to the sum of the semicrystalline transparent polyamide and the prepolymer weights; and
    said additive in a weight proportion of 0 to 20%;

wherein the sum of the semicrystalline transparent polyamide, of the prepolymer and optionally of the additive weight are equal to 100%.

4. The method according to claim 1, wherein said matrix comprises at least one semicrystalline transparent homopolyamide.

5. The method according to claim 4, wherein said at least one semicrystalline transparent homopolyamide is of formula X.Y, selected from the group consisting of P.12, B.12, and mixtures thereof.

6. The method according to claim 1, wherein said matrix comprises of at least one semicrystalline transparent copolyamide.

7. The method according to claim 6, wherein said at least one semicrystalline transparent copolyamide has formula A/X.Y; and wherein the molar proportion of unit A in said semicrystalline transparent copolyamide A/X.Y is from 91% to less than 100%, "A" being chosen from a unit obtained from at least one aminocarboxylic acid, a unit obtained from at least one branched aminocarboxylic acid and a unit obtained from at least one lactam, "X.Y" being a repeating unit obtained from the polycondensation of at least one cycloaliphatic amine or from at least one linear or branched aliphatic diamine or from at least one arylamine and from at least one dicarboxylic acid comprising from 4 to 36 carbon atoms.

8. The method according to claim 7, wherein the molar proportion of unit A in the copolyamide A/X.Y is from 95% to less than 100%.

9. The method according to claim 7, wherein the unit A is selected from PA11 or PA12, and wherein the unit X.Y is a homopolyamide comprising a cycloaliphatic diamine.

10. The method according to claim 1, wherein the prepolymer is compatible with the polyamide.

11. The method according to claim 1, wherein the prepolymer is an aliphatic polyamide, wherein the aliphatic polyamide is selected from the group consisting of PA6, PA11, PA12, PA11/6, PA6/12 and blends thereof.

12. The method according to claim 1, wherein the weight proportion of the prepolymer is from 0.1% to 20%, relative to the weight of the composition.

13. The method according to claim 1, wherein the weight proportion of the prepolymer is from 1% to 30% relative to the weight of the prepolymer-polyamide.

14. The method according to claim 1, wherein the prepolymer comprises PA11.

15. The method according to claim 1, wherein the at least one additive is selected from the group consisting of core-shell type, stabilizers, dyes, plasticizers, flame retardants, fibers, fillers and mixtures thereof.

16. The method according to claim 1, wherein the prepolymer is selected from the group consisting of monoNH$_2$ prepolymer, and monoacid prepolymer.

17. A composition comprising:
from 60 to 99.95% by weight of at least one semicrystalline transparent copolyamide;
from 0.05% to 20% by weight of at least one prepolymer with a number-average molecular mass from 1000 to 15 000 g/mol, wherein said prepolymer is a monofunctional acid or monofunctional amine the weight proportion of the semicrystalline transparent copolyamide is from 60 to 99.95 and the weight proportion of the prepolymer is from 40% to 0.1%, relative to the sum of the weight of the transparent semicrystalline copolyamide and the weight of the prepolymer;
from 0 to 20% by weight of one or more additives;

wherein the composition is free of nucleating agent and is free of impact modifier,
wherein the composition is formed by dry blending the at least one semicrystalline transparent copolyamide, the at least one prepolymer and the one or more additives together, and wherein the composition has improved crystallization kinetics and reduced warpage and the same or improved transparency properties and the same or improved mechanical properties, when compared with the same composition free of prepolymer.

18. The composition according to claim 17, wherein the semicrystalline transparent copolyamide is of formula A/X.Y, and wherein the molar proportion of unit A in the copolyamide A/X.Y is from 91% to less than 100%, "A" being chosen from a unit obtained from at least one aminocarboxylic acid, a unit obtained from at least one branched aminocarboxylic acid and a unit obtained from at least one lactam, "X.Y" being a repeating unit obtained from the polycondensation of at least one cycloaliphatic amine or from at least one linear or branched aliphatic diamine or from at least one arylamine and from at least one dicarboxylic acid comprising from 4 to 36 carbon atoms.

19. The composition according to claim 18, wherein the molar proportion of unit A in the copolyamide A/X.Y is from 95% to less than 100%.

20. The composition according to claim 18, wherein the unit A is selected from PA11 or PA12, and the unit X.Y is a homopolyamide comprising a cycloaliphatic diamine.

21. The composition according to claim 17, wherein the prepolymer is compatible with the polyamide.

22. The composition according to claim 17, wherein the prepolymer has a number-average molecular mass from 1000 to 10 000 g/mol.

23. The composition according to claim 17, wherein the weight proportion of prepolymer is from 0.1% to 20% relative to the total weight of the composition.

24. The composition according to claim 17, wherein the weight proportion of prepolymer is from 1% to 30% relative to the total weight of the prepolymer and the polyamide.

25. The composition according to claim 17, wherein the prepolymer comprises PA11.

26. The composition according to claim 17, wherein the one or more additives are selected from the group consisting of stabilizers, dyes, plasticizers, flame retardants, fibers and fillers.

27. A method for the manufacture of articles wherein the method comprises at least one step of extrusion, injection or molding of a composition formed from the method according to claim 1.

28. The method according to claim 27, wherein the articles are selected from sports shoes, and the method comprises injection.

29. A process for preparing a composition, wherein the process comprises a step of dry blending a prepolymer with at least one semicrystalline transparent polyamide and optionally at least one additive, wherein
said at least one semicrystalline transparent polyamide is present in a proportion of from 60% to 99.95% by weight, relative to the sum of the weights of the polyamide and the prepolymer;
wherein said prepolymer is a monofunctional acid or monofunctional amine,
said prepolymer being present in a proportion of 0.05% to 20% by weight, relative to the sum of the weights of polyamide and the prepolymer, said additive being in a proportion by weight of 0 to 20%;
the sum of the weights of the polyamide, the prepolymer and optionally the additive being equal to 100%,
said composition being free of nucleating agent,
whereby said composition has improved crystallization kinetics and reduced warpage and the same or improved transparency properties and the same or improved mechanical properties, when compared with the same composition free of prepolymer.

30. The method according to claim 1, wherein said matrix comprises of at least one semicrystalline transparent copolyamide, wherein the at least one semicrystalline transparent copolyamide has formula A/X.Y/Z; and wherein the molar proportion of unit A in said semicrystalline transparent copolyamide A/X.Y/Z is from 91% to less than 100%, "A" being chosen from a unit obtained from at least one aminocarboxylic acid, a unit obtained from at least one branched aminocarboxylic acid and a unit obtained from at least one lactam, "X.Y" being a repeating unit obtained from the polycondensation of at least one cycloaliphatic amine or from at least one linear or branched aliphatic diamine or from at least one arylamine and from at least one dicarboxylic acid comprising from 4 to 36 carbon atoms, and "Z" being a unit that is similar to but different from A or a unit that is similar to but different from X.Y.

31. The method according to claim 1, wherein the at least one semicrystalline transparent polyamide is mixed with a PEBA.

32. The method of claim 1, wherein the compositions comprises at least one core-shell type modifier additive.

* * * * *